United States Patent [19]

Radocaj

[11] 4,416,648
[45] Nov. 22, 1983

[54] BELT TENSIONER

[75] Inventor: Mijo Radocaj, Massillon, Ohio

[73] Assignee: Dyneer Corporation, Canton, Ohio

[21] Appl. No.: 240,822

[22] Filed: Mar. 5, 1981

Related U.S. Application Data

[63] Continuation-in-part of Ser. No. 224,468, Jan. 12, 1981, abandoned.

[51] Int. Cl.³ .............................................. F16H 7/12
[52] U.S. Cl. .................................... 474/135; 474/138
[58] Field of Search ............... 474/135, 136, 132, 133, 474/134, 111, 117, 118, 110; 403/325, DIG. 8

[56] References Cited

U.S. PATENT DOCUMENTS

| | | | |
|---|---|---|---|
| 389,335 | 9/1888 | Spear | 403/328 |
| 2,051,488 | 8/1936 | Kottlowski et al. | 474/135 |
| 2,474,360 | 6/1949 | Jimerson | 403/DIG. 8 |
| 2,585,985 | 2/1952 | Anderson | 403/DIG. 8 |
| 2,703,019 | 3/1955 | Burawoy | 474/138 |
| 3,413,866 | 12/1968 | Ford | 474/138 |
| 3,631,734 | 1/1972 | Wagner | 474/117 |
| 3,710,634 | 1/1973 | Tamaru et al. | 474/111 |
| 3,812,733 | 5/1974 | Yoshida | 474/138 |
| 4,108,013 | 8/1978 | Sragal | 474/135 |
| 4,291,416 | 9/1981 | Hoeptner | 474/138 |
| 4,298,342 | 11/1981 | Clayton et al. | 474/110 |
| 4,299,584 | 10/1981 | Sproul | 474/135 |
| 4,300,890 | 11/1981 | Hallmann et al. | 474/138 |

FOREIGN PATENT DOCUMENTS

| | | |
|---|---|---|
| 324793 | 2/1930 | United Kingdom . |
| 1013876 | 12/1965 | United Kingdom . |
| 1134634 | 11/1968 | United Kingdom . |
| 1279526 | 6/1972 | United Kingdom . |

*Primary Examiner*—John E. Murtagh
*Assistant Examiner*—Andrew Joseph Rudy
*Attorney, Agent, or Firm*—Frease & Bishop

[57] ABSTRACT

A device for tensioning the endless drive belt for vehicle accessories. A housing is mounted in a fixed position adjacent the drive belt. A shaft assembly is slidably mounted in an axial bore formed in the housing and includes a stub shaft portion extending outwardly from the housing through a slot formed in one of the housing walls. An idler pulley is rotatably mounted on the stub shaft and is moved into tensioning engagement with the drive belt by a compression coil spring which is adjustably mounted in the housing bore by a spring guide. The spring slidably moves the shaft assembly in a belt tensioning direction within the housing bore. Concavely curved surfaces are formed in certain areas of the shaft assembly within the housing. Roller means are interposed between and are biased by a spring into a wedging relationship with the curved shaft surfaces and adjacent housing walls. The roller means permits free movement of the shaft assembly and idler pulley in the belt tensioning direction while preventing movement of the shaft assembly in the opposite nontensioning direction because of the wedging action of the roller means. In another embodiment, the shaft is operatively connected to a pivotally mounted vehicle accessory whereupon sliding movement of the shaft pivots the accessory to tension the drive belt which is engaged with the accessory pulley.

6 Claims, 21 Drawing Figures

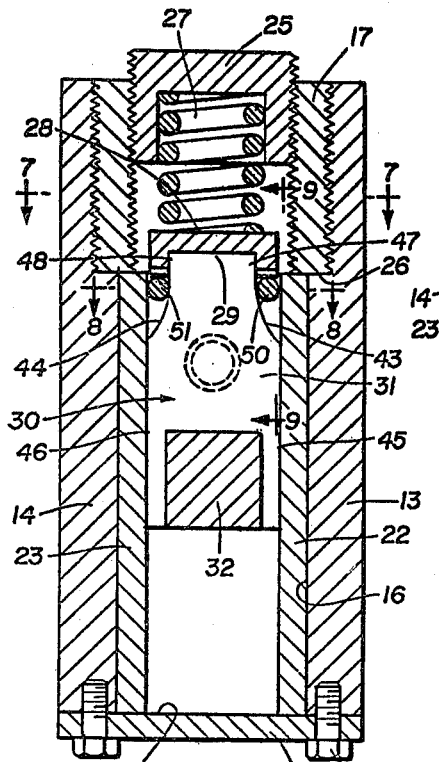
FIG. 6
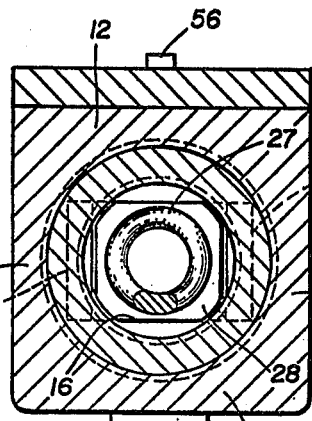
FIG. 7
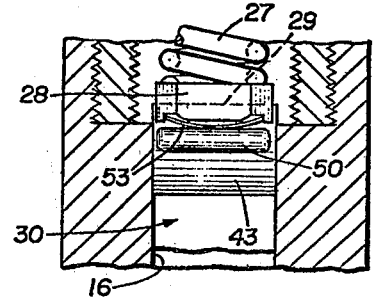
FIG. 8
FIG. 9
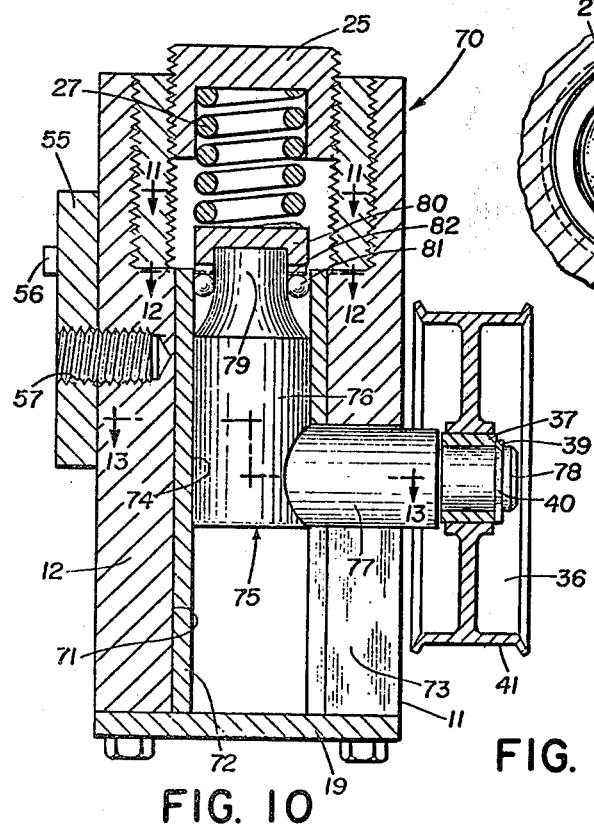
FIG. 10
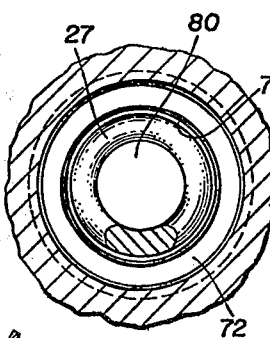
FIG. 11
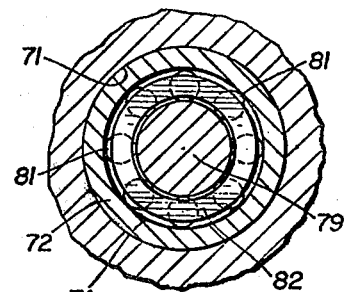
FIG. 12
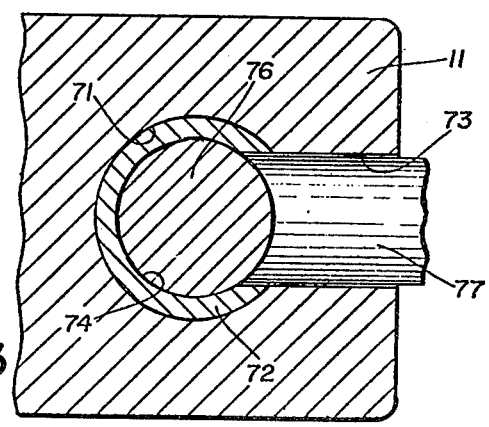
FIG. 13

BELT TENSIONER

CROSS REFERENCE TO RELATED APPLICATION

This application is a continuation-in-part of my copending application Ser. No. 224,468, filed Jan. 12, 1981 now abandoned.

BACKGROUND OF THE INVENTION

1. Field of the Invention

The invention relates to belt tensioning devices, and in particular to spring-biased belt tensioning devices for use with the endless drive belts of the drive systems for vehicle accessories. More particularly, the invention relates to an extremely simple and inexpensive belt tensioner operable by a compression coil spring which applies a nearly constant predetermined tensioning force on the endless drive belt by an idler pulley or by pivotal movement of one of the vehicle accessories, and in which a one-way clutch prevents movement of the idler pulley or accessory in the opposite nontensioning direction.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

Other known types of belt tensioners and tensioning arrangements will pivot one of the vehicle accessories toward belt tensioning engagement either by springs, as shown in U.S. Pat. Nos. 3,768,324 and 3,924,483, or by a hydraulic snubber, as shown in U.S. Pat. No. 3,132,596.

Other types of tensioning devices and arrangements are provided with some type of mechanical retaining means, usually a ratchet-pawl retaining mechanism, which limits the movement of the belt tensioning member in an opposite nontensioning direction, thereby maintaining a constant tensioning force on the endless drive belt and eliminating the undesirable effects of belt whipping. Examples of these prior constructions and arrangements having such retaining mechanisms are shown in U.S. Pat. Nos. 2,051,488, 2,703,019, 3,413,866, 3,631,734 and 3,812,733.

There is no known belt tensioning device of which I am aware which imparts a nearly constant predetermined tensioning force on an endless accessory drive belt by use of a compression coil spring in a simple and inexpensive arrangement, which maintains this nearly constant pressure on the belt whether the engine is on or off or operating at various speeds, and which reduces belt whip and achieves a highly efficient damping effect by a one-way clutch which prevents retraction of the tensioning components from their forwardmost belt tensioning position.

SUMMARY OF THE INVENTION

Objectives of the invention include providing an improved belt tensioner which is actuated by a single compression coil spring that exerts a biasing force on a shaft assembly which is slidably mounted within a compact and rugged housing to maintain a nearly constant predetermined tensioning force on the endless drive belt of a vehicle accessory drive system whether the engine is on or off or operating at various speeds or conditions. Another object is to provide a belt tensioner in which the shaft assembly has a stub shaft which extends perpendicularly outwardly from the housing with an idler pulley being mounted on the end of the stub shaft for tensioning engagement with the drive belt. A further object is to provide such a belt tensioner having a one-way clutch which includes wedging members, such as cylindrical rollers or spherical balls, which are biased by a spring into a wedging relationship with concavely curved surfaces formed on an end of the shaft assembly whereby the wedging members prevent movement of the shaft assembly and, correspondingly, of the idler pulley in the nontensioning direction, thereby eliminating the harmful effects of belt whipping and providing improved damping and elimination of vibration. Another object is to provide means for adjusting the tension of the coil spring by simple adjustment of a spring guide which is threadably mounted on one end of the tensioner housing.

It is also another object of the invention to provide such a belt tensioner in which the shaft assembly is engaged with a pivotally mounted vehicle accessory, whereupon movement of the shaft assembly in the belt tensioning direction pivots the accessory to apply a tensioning force on the belt engaged with the accessory pulley, and in which a one-way clutch is operatively engaged with the shaft assembly maintaining it in a forwardmost belt tensioning position. Still another object is to provide a belt tensioner which is of an extremely rugged and inexpensive design, which reduces maintenance and repair problems, which provides a sufficient biasing force by use of a single compression coil spring, which provides improved damping effect to the tensioner preventing backlash due to belt whip, and which achieves the stated objectives in a simple, efficient and effective manner, and which solves problems and satisfies needs existing in the art.

These objects and advantages are obtained by the improved belt tensioner construction for tensioning an endless drive belt of the drive system for vehicle accessories, the general nature of which may be stated as including a housing adapted to be mounted adjacent the belt; shaft means slidably mounted within the housing and movable in a belt tensioning direction for moving a pulley into tensioning engagement with the drive belt; spring means operatively engaged with the shaft means for slidably moving the shaft means in the belt tensioning direction; and clutch means operatively engaged with the shaft means for permitting movement of the shaft means in the belt tensioning direction and for restraining movement of the shaft means in an opposite nontensioning direction to maintain the pulley in a forwardmost belt tensioning position.

BRIEF DESCRIPTION OF THE DRAWINGS

Preferred embodiments of the invention—illustrative of the best modes in which applicant has contemplated applying the principles—are set forth in the following description and are shown in the accompanying drawings and are particularly and distinctly pointed out and set forth in the appended claims.

FIG. 6 is a sectional view taken on line 6—6, FIG. 5;

FIG. 7 is a sectional view taken on line 7—7, FIG. 6;

FIG. 8 is a fragmentary sectional view taken on line 8—8, FIG. 6;

FIG. 9 is a fragmentary sectional view taken on line 9—9, FIG. 6;

FIG. 10 is a sectional view similar to FIG. 5 showing another embodiment of the improved belt tensioner construction;

FIG. 11 is an enlarged fragmentary sectional view taken on line 11—11, FIG. 10;

FIG. 12 is an enlarged fragmentary sectional view taken on line 12—12, FIG. 10;

FIG. 13 is an enlarged fragmentary sectional view taken on line 13—13, FIG. 10;

Similar numerals refer to similar parts throughout the drawings.

DESCRIPTION OF THE PREFERRED EMBODIMENTS

First Embodiment

Figure 1:
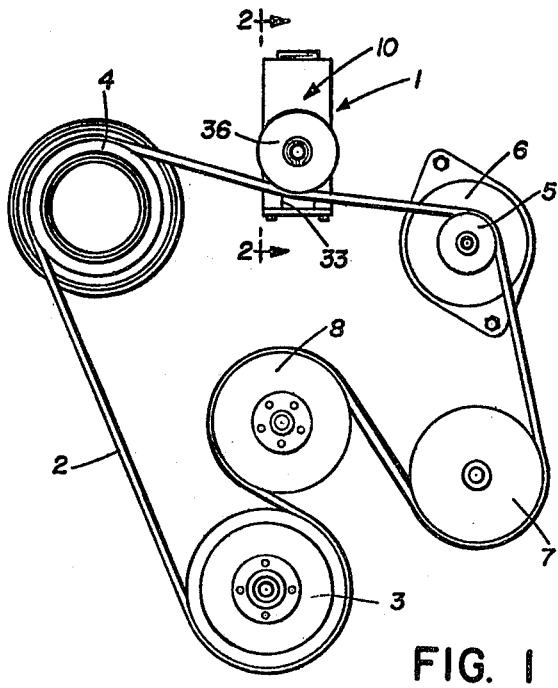
FIG. 1 is a diagrammatic view looking toward the front of an engine illustrating an endless drive belt operatively connected to and driving the vehicle accessories, with the improved belt tensioner engaged with the belt.

Referring to FIG. 1 of the drawings, the improved belt tensioner is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which, in turn, are mounted on an engine in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Improved belt tensioner 1 includes a housing, indicated generally at 10, preferably formed of an integral metal casting. Housing 10 has a generally elongated, rectangular shape defined by front and rear walls 11 and 12 and side walls 13 and 14. An axially extending bore 16, preferably rectangular in cross-sectional shape (FIGS. 5, 6 and 7), is formed in housing 10. Bore 16 terminates at one end in an enlarged circular bore portion 17 and at the other end in an open bottom 18. Open bottom 18 is closed by a stop plate 19 mounted on the housing walls by a plurality of bolts 20. A pair of flat slide plates 22 and 23 (FIGS. 6 and 7) are located within bore 16 and extend throughout its axial length along walls 13 and 14.

An internally and externally threaded, cup-shaped spring guide 25 is adjustably mounted in enlarged top bore 17 and abuts against an annular shoulder 26 formed by the junction of bores 16 and 17. A compression coil spring 27 is seated within spring guide 25 and abuts against a U-shaped member 28 which is seated on the complementary-shaped top end 29 of a slidably mounted shaft assembly, indicated generally at 30 (FIG. 6). Shaft assembly 30 includes a main body portion 31 and an outwardly extending stub shaft portion 32. Portion 31 is slidably mounted within housing bore 16 between slide plates 22 and 23. Stub shaft 32 extends perpendicularly outwardly from main shaft body 31 through a slot 33 which is formed in front wall 11. Slot 33 extends axially along the lower portion of bore 16 and communicates with the bore. The majority of main shaft body 31 is rectangular in cross-sectional configuration (FIGS. 5, 6 and 7) except for upper end portion 29. The major portion of stub shaft 32 also is rectangular in cross-sectional configuration and preferably is formed integrally with main body portion 31.

A usual idler pulley 36 is rotatably mounted by a bearing ring 37 on a cylindrical extended end 38 of stub shaft 32. Pulley 36 is retained on extended shaft end 38 by a retaining ring 39 which is received within an annular groove 40 formed in shaft end 38. Pulley 36 is formed with an outer peripheral groove 41 in which belt 2 is tensionally engaged, as described more fully below.

Figure 5:
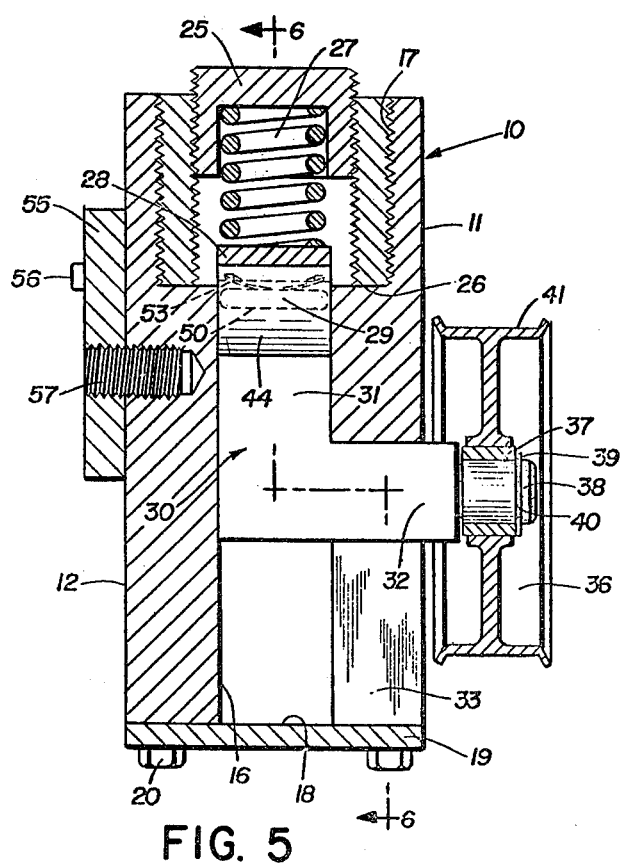
FIG. 5 is an enlarged sectional view taken on line 5—5, FIG. 3, with the engine mounting bracket and bolt removed therefrom.
Figure 3:
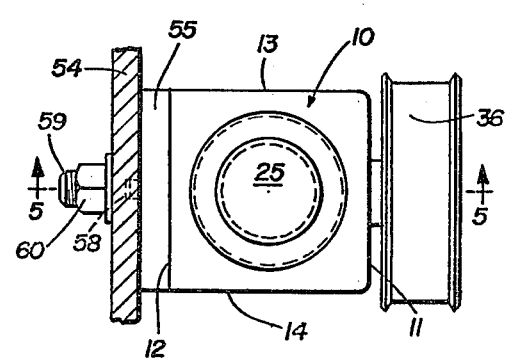
FIG. 3 is a top plan view of the improved belt tensioner as shown in FIG. 2.
Figure 4:
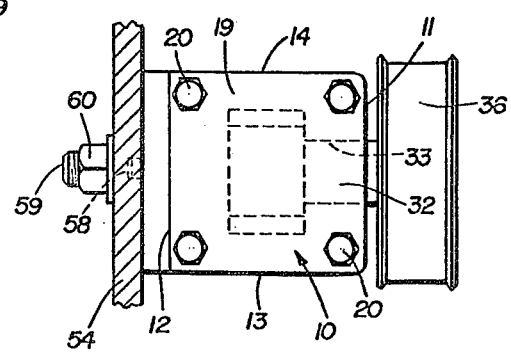
FIG. 4 is a bottom plan view of the belt tensioner as shown in FIG. 2.

In accordance with one of the main features of the invention, a one-way clutch mechanism is cooperatively engaged with shaft assembly 30 to restrain its movement in the nontensioning direction. To achieve this feature, the upper end 29 of main shaft body portion 31 is formed with a pair of spaced concavely curved surfaces 43 and 44 which curve downwardly outwardly from upper end 29 terminating with flat side surfaces 45 and 46 of shaft body portion 31 (FIGS. 5 and 6). The taper of curved surfaces 43 and 44 is very gradual, preferably less than 1°. Curved surfaces 43 and 44 terminate at their upper ends in generally straight sections 47 and 48, respectively, adjacent upper end 29. If desired, contiguous surfaces 43 and 47 and surfaces 44 and 48 may be planar tapered surfaces which achieve the same results as the straight and concavely curved surfaces described above.

A pair of cylindrical-shaped rollers 50 and 51 are located in the spaces formed between curved surfaces 43 and 44 and slide plates 22 and 23, respectively. Rollers 50 and 51 are biased into abutting wedging engagement with their respective adjacent surfaces 43-22 and 44-23, respectively, by a pair of leaf springs 53 (FIG. 9).

Figure 2:
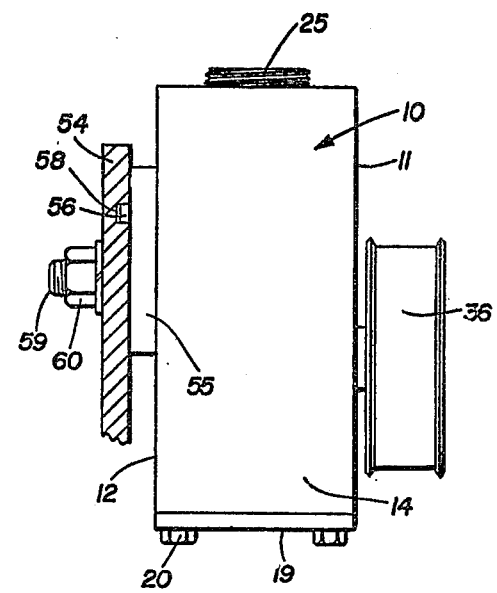
FIG. 2 is an end elevational view looking in the direction of arrows 2—2, FIG. 1, with a fragmentary portion of the tensioner engine mounting bracket shown in section.

The operation of improved belt tensioner 1 is as follows. Tensioner 1 is mounted on the vehicle engine closely adjacent belt 2 by a mounting bracket 54. A mounting plate 55 is attached to rear housing wall 12 and is formed with an outwardly projecting alignment tab 56 and a threaded hole 57 which extends through mounting plate 55 and into housing wall 12. Alignment pin 56 is seated within a complementary-shaped hole 58 formed in engine mounting bracket 54 (FIG. 2), and a stud bolt 59 threadedly engaged in hole 57 mounts tensioner 1 on bracket 54 by a nut 60. Tensioner 1 may be placed in various locations with respect to belt 2 with the position shown in FIG. 1 being generally midway between alternator pulley 5 and air pump pulley 4.

Spring guide 25 is threadably advanced axially inwardly by use of a spanner wrench or similar tool which moves shaft assembly 30 along bore 16 which, in turn, moves idler pulley 36 against belt 2 to apply a predetermined tensioning force thereon. Spring guide 25 is adjusted until the desired tensioning force is exerted by coil spring 27 and idler pulley 36. Spring 27 will continue to exert this predetermined tensioning force against the belt generally throughout the belt life. As belt 2 stretches, shaft assembly 30 will move axially downwardly within housing 10 moving idler pulley 36 in the belt tensioning direction to maintain the biasing force of spring 27 on the belt.

Shaft assembly 30 has a certain distance through which it can travel (FIGS. 5 and 6), which is determined by the spacing between the bottom of stub shaft 32 and stop plate 19. Accordingly, idler pulley 36 will also travel this amount which will be sufficient to compensate for the usual amount of stretch that belt 2 experiences throughout the belt life. Spring guide 25 can always be advanced farther into housing 10 to maintain the desired tensioning force on belt 2 as shaft assembly 30 approaches stop plate 19.

One of the main features of the invention which distinguishes belt tensioner 1 from other known belt tensioners is the one-way clutch effect achieved by rollers 50 and 51. Rollers 50 and 51 have no effect on the downward axial movement of shaft assembly 30 within housing bore 16. The rollers merely move downwardly along with shaft assembly 30 by the action of U-shaped member 28 and roller springs 53. However, due to the biasing force of springs 53 which maintain rollers 50 and 51 in abutting engagement with curved surfaces 43 and 44 and the adjacent surfaces of slide plates 22 and 23, the rollers prevent any upward movement of shaft assembly 30 within bore 16. The rollers create a wedging action between the adjacent surfaces preventing any upward movement. Thus, any belt whipping action which is experienced by idler pulley 36 that attempts to move the pulley and connected shaft assembly 30 in a nontensioning direction is absorbed or resisted by this wedging relationship of rollers 50 and 51 with their adjacent abutting surfaces. It is the slope of curved surfaces 43 and 44 in combination with the biasing action of springs 53 which achieves the wedging effect.

Second Embodiment

Another embodiment of the improved belt tensioner construction is indicated generally at 70, and is shown in FIGS. 10 through 13. Many of the components of tensioner 70 are similar to those of tensioner 1 and, therefore, are not discussed in detail. The main difference between tensioner 70 and tensioner 1 is the particular configuration and construction of the one-way clutch means. The internal axial bore 71 of the tensioner housing has a cylindrical configuration, and is provided with a cylindrical slide sleeve 72 telescopically mounted therein which replaces the spaced slide plates 22 and 23 of tensioner 1. An elongated, generally axially extending slot 73 is formed in slide sleeve 72 and in front wall 11 of the modified tensioner housing and provides the same function as slot 33 of tensioner 1.

A shaft assembly, indicated generally at 75, is slidably mounted within the cylindrical interior 74 of slide sleeve 72. Shaft assembly 75 includes a main body portion 76 and a stub shaft portion 77. Idler pulley 36 is rotatably mounted on an extended end 78 of stub shaft 77 in a similar manner as discussed above with respect to tensioner 1. Shaft main body portion 76 and stub shaft portion 77 both have cylindrical configurations instead of the rectangular cross-sectional configurations of shaft assembly 30 of tensioner 1. The diameter of shaft main body portion 76 is complementary to bore 74 of slide sleeve 72 so as to provide a sliding engagement therebetween.

Another modification and difference in tensioner 70 is that the upper end 79 of shaft main body portion 76 has the shape of the lower half of a hyperboloid of the type in which the plane sections have a circular, cross-sectional configuration (FIG. 10). Upper end 79 also may have a conical configuration with straight planar tapered surfaces resembling a portion of a cone. A shallow, circular cup-shaped member 80 is mounted on the top of the upper end 79 of shaft assembly 75 against which coil spring 27 exerts its biasing force. A plurality of spherical balls 81 replace the above-discussed cylindrical rollers 50 and 51. Balls 81 are spaced circumferentially about upper shaft end 79 and are in abutting engagement with the curved surface of shaft end 79 and the interior surface of slide sleeve 72. A spring disc-shaped washer 82, such as a Belleville washer, is telescopically mounted on upper shaft end 79 and is placed in a biasing relationship against balls 81 by the annular end of cup-shaped member 80. These components are similar to U-shaped member 28 and springs 53 of tensioner 1.

The operation of modified belt tensioner 70 is similar to that described above with respect to belt tensioner 1. Spring 27 supplies the belt tensioning force and moves shaft assembly 75 downwardly within sleeve bore 74 (FIG. 10) moving idler pulley 36 into tensioning engagement with drive belt 2. Balls 81 will move freely downwardly within sleeve interior 74 as shaft assembly 75 moves downwardly but will wedgingly engage the sloped surfaces of shaft end 79 if shaft assembly 75 attempts to move upwardly within the housing bore. Balls 81 are biased by spring washer 82 into this wedging relationship between the curved surface of upper shaft end 79 and the interior surface of slide sleeve 72.

Third Embodiment

Figure 14:
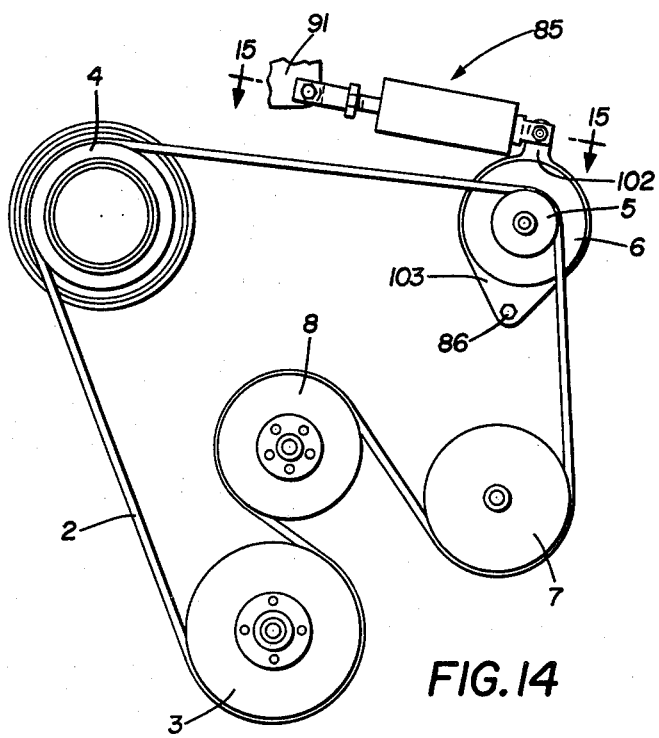
FIG. 14 is a diagrammatic view similar to FIG. 1 showing another embodiment of the improved belt tensioner construction operatively engaged with a pivotally mounted vehicle accessory.

Another embodiment of the improved belt tensioning device is indicated generally at 85, and is shown diagrammatically in FIG. 14 tensioning drive belt 2 of a vehicle accessory drive system. The drive system of FIG. 14 is identical to that of FIG. 1 except that alternator 6 is pivotally mounted at 86 and alternator pulley 5 is engaged with belt 2 for tensioning the belt as the alternator is moved in a clockwise direction about pivot 86 by belt tensioner 85.

Figure 15:
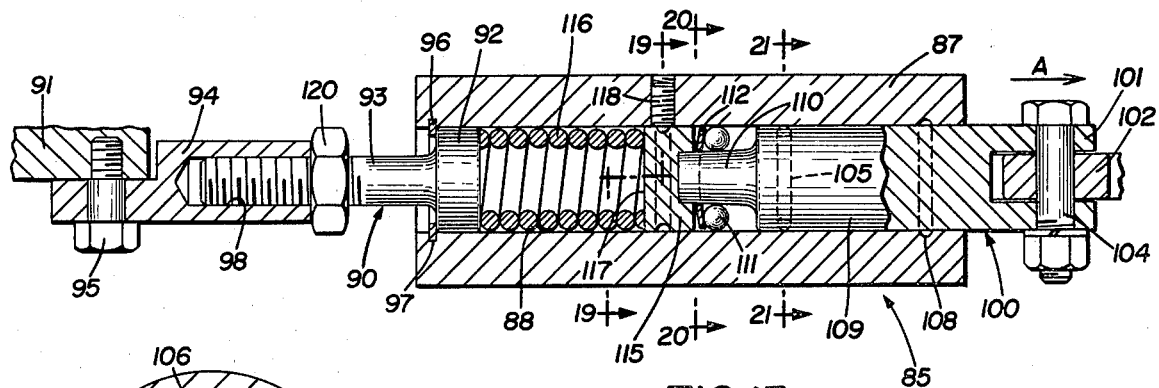
FIG. 15 is an enlarged fragmentary sectional view taken on line 15—15, FIG. 14.
Figure 16:
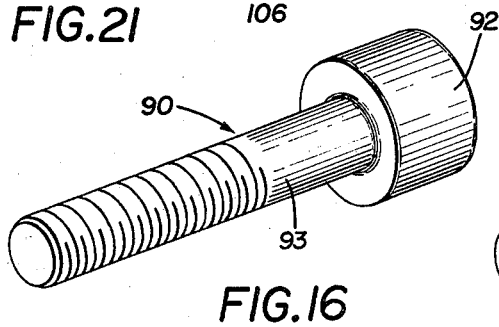
FIG. 16 is an enlarged perspective view of the stud bolt spring adjusting rod component of the modified belt tensioner of FIG. 15.

Referring to FIG. 15, belt tensioner 85 includes a tubular, cylindrical-shaped housing 87 formed with an axially extending cylindrical bore 88 which extends throughout the length of housing 87. A stub bolt spring-adjusting rod, indicated generally at 90 (FIG. 16), is slidably mounted in one end of housing bore 88 and is adapted to be connected to an engine mounting bracket 91. Tensioning rod 90 includes a disc-shaped head 92 which is complementary to housing bore 88 and is slidably mounted within bore 88. A threaded shaft 93 extends outwardly from rod head 92 and is threadably adjustably engaged within a threaded bore 98 of a connector 94 which is pivotally mounted on engine bracket 91 by a stud bolt 95. Adjusting rod 90 is retained in housing bore 88 by a retaining ring 96 which is seated within an annular groove 97 formed at one end of housing bore 88.

Figure 21:
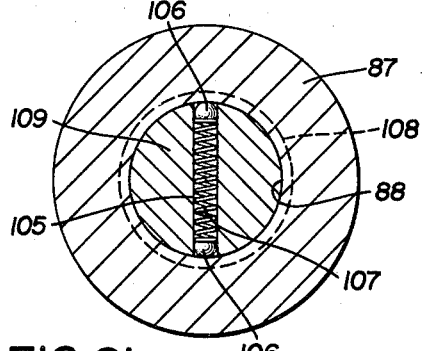
FIG. 21 is an enlarged sectional view taken on line 21—21, FIG. 15.
Figure 18:
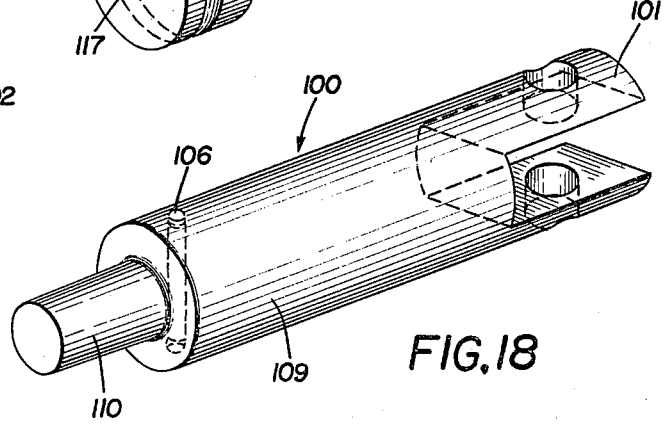
FIG. 18 is an enlarged perspective view of the shaft assembly component of the modified belt tensioner of FIG. 15.

A shaft assembly, indicated generally at 100 (FIG. 18), is slidably mounted within the other end of housing bore 88 and is formed with a split outer end 101 for pivotally mounting a projecting lug 102 of an alternator bracket 103 therein. Lug 102 is pivotally mounted within shaft end 101 by a pivot bolt 104. A hole 105 is formed in main body portion 109 of shaft assembly 100 and extends diametrically therethrough (FIG. 21). A pair of balls 106 are mounted in hole 105 by a compression spring 107 and are adapted to extend into an annular groove 108 formed near the outer end of housing bore 88 to prevent ejection of shaft assembly 100 from within housing bore 88 when tensioner 85 is disconnected from tensioning engagement with alternator 6. Thus, spring 107 and balls 106 form a spring-biased ball detent mechanism or safety stop for retaining shaft assembly 100 within the housing.

In accordance with one of the main features of the invention, a one-way clutch mechanism is operatively engaged with shaft assembly 100. The inner end of shaft 100 is formed with a curved or conical-shaped end 110 similar to the upper end 79 of shaft assembly 75 shown in FIG. 10. A plurality of spherical balls 111 are biased into a wedging relationship with shaft end 110 by a spring disc 112. The details of construction and operation of shaft end 110, balls 111 and spring disc 112 are similar to those of shaft end 79, balls 81 and spring 82 of tensioner 70 and, therefore, are not described in greater detail.

Figure 17:
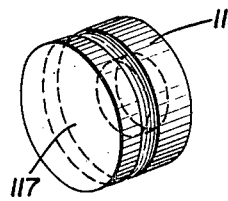
FIG. 17 is an enlarged perspective view of the end cap component of the modified belt tensioner of FIG. 15.

A disc-shaped end cap 115 (FIG. 17) is slidably mounted within housing bore 88 and is mounted on the end of curved shaft end 110. A compression coil spring 116 is mounted within housing bore 88 and is located between and is operatively engaged with adjusting rod head 92 and the circular planar surface 117 of end cap 115. Spring 116 exerts a biasing force on shaft assembly 100 in the belt tensioning direction indicated by arrow A, FIG. 15.

Figure 19:
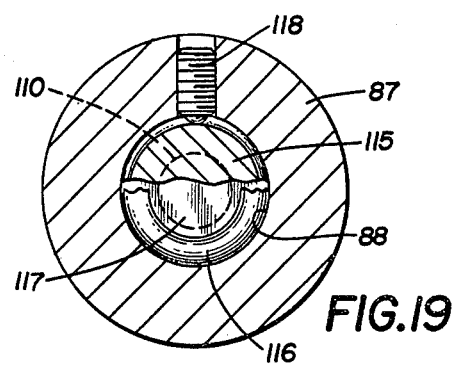
FIG. 19 is an enlarged sectional view taken on line 19—19, FIG. 15.
Figure 20:
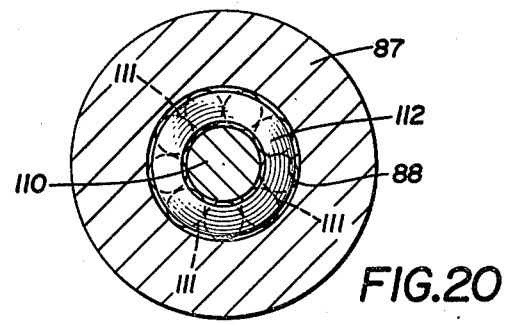
FIG. 20 is an enlarged sectional view taken on line 20—20, FIG. 15.

The operation of belt tensioner 85 is similar to that of tensioners 1 and 70 described above. Tensioner 85 is mounted on engine mounting bracket 91 and spring 116 is held in a compressed loaded state between adjusting rod head 92 and end cap 115 by holding cap 115 within housing bore 88 by a setscrew 118 (FIGS. 15 and 19) until tensioner 85 is connected with alternator attachment lug 102. After tensioner 85 is installed on an engine, setscrew 118 is loosened enabling spring 116 to bias shaft assembly 100 in the belt tensioning outward direction from housing 87 pivoting alternator 6 in a clockwise direction (FIG. 14), whereupon alternator pulley 5 applies a tensioning force on drive belt 2.

In accordance with one of the main features of the invention, the one-way clutch assembly provided by curved shaft end 110, spherical balls 111 and spring disc 112 permits movement of shaft assembly 100 only in the outward belt tensioning direction from housing 87 while preventing any movement of the shaft assembly in the opposite nontensioning direction due to the wedging engagement of balls 111 between tapered shaft end 100 and the bore-forming walls of housing 87.

The particular tensioning force exerted by spring 116 can be adjusted by movement of adjusting rod 90 within threaded bore 98 of engine mounting bracket connector 94. A locking nut 120 on threaded shaft 93 locks spring adjusting rod 90 in its adjusted position within threaded connector bore 98.

SUMMARY

Stop means are provided for each of the tensioner embodiments described above to retain the shaft assemblies within their respective housings when the pulleys are not tensioningly engaged with a drive belt as during storage and shipment, as well as preventing the ejection of the shaft assemblies from the housings in the event of belt breakage. Stop plates 19, which are mounted on the bottoms of the open ends of the housing bores for tensioners 1 and 70, provide this feature for tensioners 1 and 70, and spring detent balls 106 provide this feature for tensioner 85.

Improved belt tensioners 1, 70 and 85 provide constructions which have a number of advantageous features. These constructions prevent backing off or slacking of belt 2 as the result of belt whipping, since idler pulley 36 and alternator pulley 5 are prevented from any movement in the nontensioning direction due to the unique wedging action exerted by the rollers and spherical balls against the upper portion of their respective shaft assemblies. Furthermore, these wedging members do not interfere in any manner with the movement of the shaft assemblies in the belt tensioning direction. The functions provided by the cylindrical rollers and spherical balls are similar, and the particular configuration of the wedging member which is used in combination with the engaged upper shaft end does not affect the concept of the invention. Other types of wedging members and engagements could be used without departing from the concept of the invention.

Another advantage of the improved belt tensioner constructions is that maintenance can be performed easily on the vehicle accessories by releasing the tensioning pressure exerted by coil springs 27 and 116 by removing or sufficiently backing off spring guide 25 or rotating spring rod 90. Another advantage of the improved belt tensioners is the relatively simple and inexpensive construction of the various components which can be manufactured easily in mass quantities, and which can be mounted on the engine by a simple mounting bracket 54.

Accordingly, the improved belt tensioner constructions provide a simplified, effective, safe, inexpensive, rugged and efficient tensioning means which achieves all of the enumerated objectives, provides for eliminating difficulties encountered with prior tensioning devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner is constructed and used, the characteristics of the construction, and the advantageous, new and useful results obtained; the new and useful structures, devices, elements, arrangements, parts, and combinations, are set forth in the appended claims.

I claim:

1. A device for tensioning an endless drive belt of a vehicle engine accessories drive system of the type in which bracket means is pivotally mounted on the engine with an idler pulley rotatably mounted thereon for tensioned engagement with the drive belt when the bracket means is moved in belt tensioning direction, and in which the device has a housing containing a spring biased shaft movable in the housing in belt tensioning direction, and in which a one-way clutch is provided restraining shaft movement in the other direction, wherein the improvement comprises:
    (a) a tubular housing having first and second open ends and having a cylindrical bore therein extending between said open ends;
    (b) a shaft having outer and inner ends including a main cylindrical body having a portion projecting out of said housing at said first housing end, and another portion which is slidably mounted within and movable in belt tensioning direction within said cylindrical bore, and the shaft also having an axially extending reduced diameter conical portion projecting within said bore from said body toward the second end of said housing to the inner shaft end;
    (c) means pivotally connecting said outer shaft end with said bracket means;
    (d) first spring means having inner and outer ends in said cylindrical bore located between the inner shaft end and the second open housing end;
    (e) an end cap in said bore engaged between the inner end of said first spring means and said conical portion inner shaft end;
    (f) tension adjusting means for said first spring means engaging said first spring means outer end within said cylindrical bore adjacent said second housing end and adapted to be pivotally mounted on said engine;
    (g) one-way clutch means including spherical ball means located within said cylindrical bore between said end cap and said body for wedging engagement with said conical shaft portion; and
    (h) second spring means operatively engaged with said ball means and end cap biasing said ball means into wedging engagement with said conical shaft portion;
    (i) whereby said first spring means biasing tension may be adjusted and said shaft body is biased for movement in belt tensioning direction.

2. The belt tensioner construction defined in claim 1 in which the means pivotally connecting said outer shaft end with said bracket means includes a bifurcated formation on said outer shaft end and lug means projecting from said bracket means, and said bifurcated formation and lug means being pivotally connected together.

3. The belt tensioner construction defined in claim 1 in which said second spring means is a spring disk telescopically mounted on said conical shaft portion.

4. The belt tensioner construction defined in claim 1 in which said first spring means is a compression coil spring.

5. The belt tensioner construction defined in claim 4 in which releasable stop means is mounted on the housing engageable with said end cap to hold said first spring means in a compressed loaded state until the device is pivotally connected with said bracket means.

6. The belt tensioner construction defined in claim 1 in which second spring biased detent stop means is mounted in a hole formed in said shaft body portion which is slidably mounted within and movable within said cylindrical bore adjacent said shaft portion inner end; and in which said second stop means is engageable with an annular groove formed in said housing bore adjacent said first housing end to prevent ejection of said shaft from said housing in the event of belt breakage.

* * * * *